US008605678B2

(12) United States Patent
Karaoguz

(10) Patent No.: US 8,605,678 B2
(45) Date of Patent: Dec. 10, 2013

(54) ANTICIPATORY HAND-OFF SETUP BETWEEN NETWORKS

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 936 days.

(21) Appl. No.: 12/020,800

(22) Filed: Jan. 28, 2008

(65) Prior Publication Data
US 2008/0181179 A1 Jul. 31, 2008

Related U.S. Application Data

(60) Provisional application No. 60/887,484, filed on Jan. 31, 2007.

(51) Int. Cl.
*H04W 4/00* (2009.01)
*H04W 36/00* (2009.01)

(52) U.S. Cl.
USPC ........... 370/331; 370/332; 455/436; 455/437; 455/440; 455/441; 455/442

(58) Field of Classification Search
None
See application file for complete search history.

(56) References Cited

U.S. PATENT DOCUMENTS

| | | | |
|---|---|---|---|
| 6,711,408 B1 * | 3/2004 | Raith | 455/440 |
| 6,721,567 B1 * | 4/2004 | Wang et al. | 455/440 |
| 2002/0187780 A1 * | 12/2002 | Souissi | 455/426 |
| 2003/0016655 A1 | 1/2003 | Gwon | |
| 2003/0157935 A1 * | 8/2003 | Kauhanen | 455/436 |
| 2004/0058678 A1 * | 3/2004 | deTorbal | 455/437 |
| 2006/0019663 A1 * | 1/2006 | Cuffaro et al. | 455/436 |
| 2006/0058031 A1 * | 3/2006 | Nemoto | 455/436 |
| 2006/0176853 A1 * | 8/2006 | Liu et al. | 370/331 |
| 2006/0211418 A1 * | 9/2006 | Hofmann | 455/426.1 |
| 2006/0221900 A1 * | 10/2006 | Zhang et al. | 370/331 |
| 2006/0246902 A1 * | 11/2006 | Back et al. | 455/436 |
| 2007/0160049 A1 * | 7/2007 | Xie et al. | 370/390 |

FOREIGN PATENT DOCUMENTS

| | | |
|---|---|---|
| EP | 0 369 535 A2 | 5/1990 |
| EP | 1 061 752 A1 | 12/2000 |

OTHER PUBLICATIONS

European Search Report corresponding to European Patent Application No. 08001748.6-2412, completed Jun. 4, 2008, 3 pages.

* cited by examiner

*Primary Examiner* — Yemane Mesfin
*Assistant Examiner* — Christine Duong
(74) *Attorney, Agent, or Firm* — Brinks Gilson & Lione

(57) ABSTRACT

A system and method for performing anticipatory hand-off setup between communication networks. Various aspects of the present invention may, for example and without limitation, provide a system and method for performing anticipatory hand-off setup between communication networks. For example and without limitation, prior to a determination to perform a hand-off of a mobile communication device from a first communication network to a second communication network, a determination may be made that hand-off setup information should be communicated with the second communication network. For example, such a determination may be made in anticipation of a hand-off that may or may not happen. Such hand-off setup information may then be communicated with the second communication network. Such communicated setup information may then, for example, be utilized to at least partially prepare for performing the anticipated hand-off.

20 Claims, 4 Drawing Sheets

ANTICIPATORY HAND-OFF SETUP BETWEEN NETWORKS

CROSS-REFERENCE TO RELATED APPLICATIONS/INCORPORATION BY REFERENCE

This patent application is related to and claims priority from provisional patent application Ser. No. 60/887,484 filed Jan. 31, 2007, and titled "ANTICIPATORY HAND-OFF SETUP BETWEEN NETWORKS," the contents of which are hereby incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

In a dynamic network environment, a communication system (e.g., a mobile or portable communication system) may move in and out of coverage areas associated with a plurality of different communication networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for performing anticipatory hand-off setup between communication networks, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
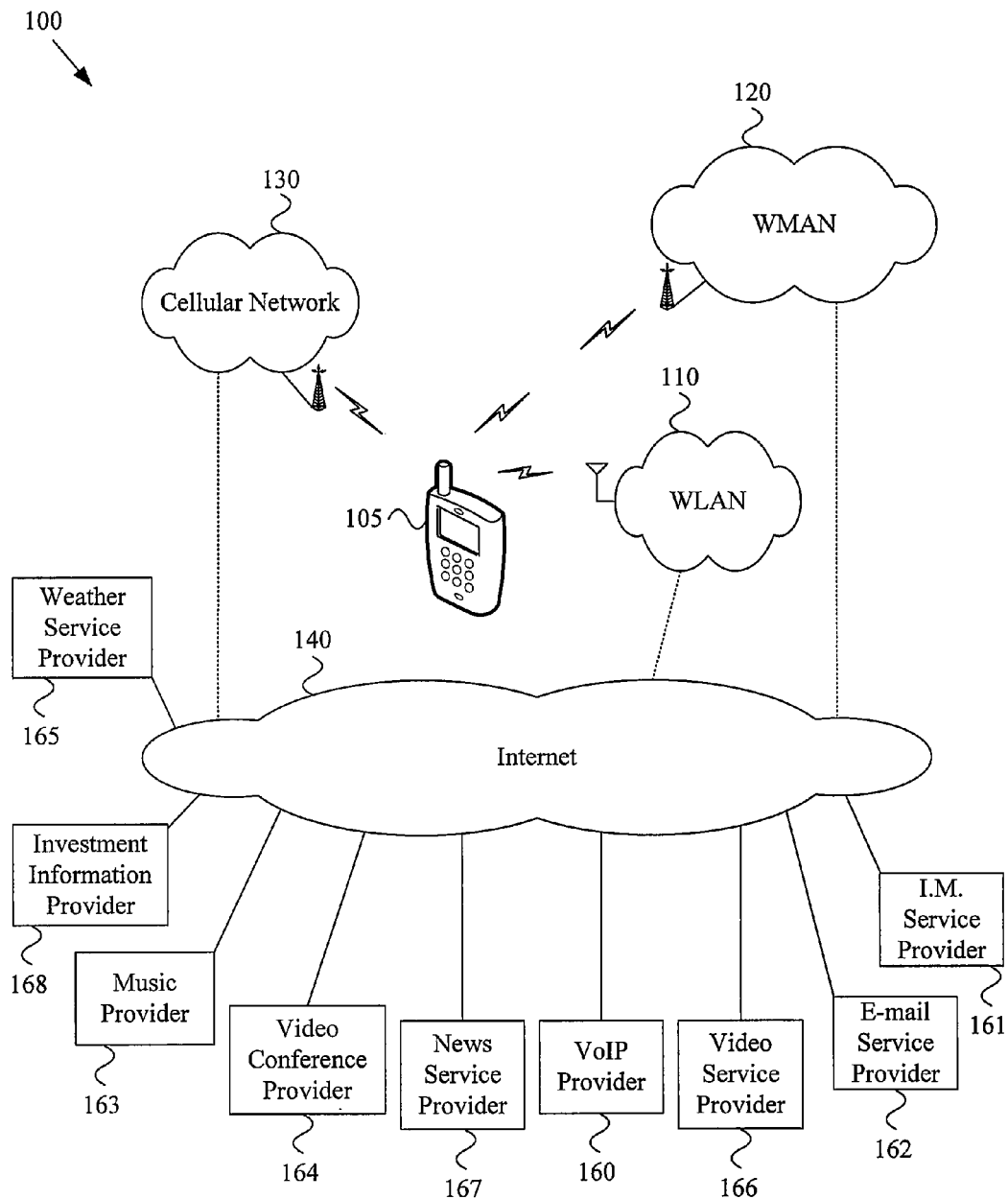
FIG. 1 is a diagram illustrating a non-limiting exemplary communication system implementing anticipatory hand-off setup in accordance with various aspects of the present invention.

Hand-offs generally occur in communication networks when a determination is made to provide communication service to a mobile (or portable) communication device with a different access point (e.g., base station) than that which is currently providing the communication service to the mobile (or portable) communication device. A hand-off may occur intra-network between access points (or base stations) in a single network. Also, a hand-off may occur inter-network between access points in different networks. Though the following discussion will generally discuss performing anticipatory hand-off activities for an inter-network hand-off, various aspects of the present invention apply to intra-network hand-offs as well.

It generally takes a significant amount of time to perform a hand-off. There are a number of steps that are generally followed during the hand-off process. For example and without limitation, typically, during utilization of a communication link, a mobile communication device ("MCD") or network access point ("AP") measures signal and/or channel qualities and determines when to perform a hand-off. For example, a decision to perform a hand-off may be based on signal-to-noise ratio measurements, signal-to-interference ratio measurements, error rate, etc. Characteristics of a plurality of channels between a mobile communication device and a plurality of communication network access points may be compared, bandwidth availability may be considered, access permissions may be considered, many other factors may be considered, and ultimately a decision to hand-off the mobile communication device from a first network access point to a second network access point will be made.

Once the determination to perform a hand-off is made, various types of communication link setup information may be shared between one or more base stations and the mobile communication device to lay the foundation for the desired hand-off. For example and without limitation, identification information, address information, channel information, signal strength information, security information, and many other types of information may be shared. A communication link between the mobile communication device and the recipient access point may then be established, and the communication link between the mobile communication device and the preceding access point may be torn down.

Latency in the hand-off process can be a problem, even between base stations or cells within a particular network. Such latency can particularly be a problem when the hand-off is occurring between different communication networks and/or between different communication networks of different types. For example, while a hand-off decision is being made and a hand-off is being setup, a user may move a mobile communication device out of range of the former network access point before a hand-off communication link with the next network access point can be established. Such a scenario may result in loss of service for a period of time or at least a period of relatively poor quality service. Reducing such hand-off latency may result in improved service to a mobile communication device. Such hand-off latency may, for example, be reduced by implementing anticipatory hand-off setup.

FIG. 1 provides an illustration of a non-limiting exemplary communication environment 100 in which anticipatory hand-off setup in accordance with various aspects of the present invention may be implemented. The exemplary environment 100 may, for example, comprise a plurality of different networks. For example, the exemplary environment 100 may comprise a Wireless Local Area Network ("WLAN") 110, a Wireless Metropolitan Area Network ("WMAN") 120, a Cellular Telecommunication Network 130 and the Internet 140. Though not illustrated, the exemplary communication system 100 may comprise any of a variety of communication networks of types thereof. For example, the exemplary environment 100 may comprise wired networks, wireless RF networks, tethered optical networks, non-tethered optical networks, Personal Area Networks ("PAN"), Wide Area Networks ("WAN"), terrestrial networks, satellite networks, etc. The scope of various aspects of the present invention should not be limited by characteristics of any particular type of communication network or characteristics thereof, unless explicitly claimed.

The exemplary communication environment 100 may also, for example, comprise various communication networks of a same type. For example and without limitation, the exemplary environment 100 may comprise a plurality of separate WLANs and/or cellular networks.

The exemplary communication environment 100 may, for example, comprise a mobile communication device ("MCD") 105. The mobile communication device 105 is illustrated as a multimode telephone, but may comprise characteristics of any of a variety of mobile (or portable) communication devices. For example and without limitation, the mobile communication device 105 may comprise characteristics of a cellular telephone, pager, personal digital assistant, mobile email device, handheld computer, laptop computer, mobile music player, mobile video player, mobile gaming device, etc. The scope of various aspects of the present invention should not be limited by characteristics of any particular type of mobile communication device or characteristics thereof, unless explicitly claimed.

The exemplary communication environment 100 may, for example, comprise a plurality of communication service providers. For example and without limitation, the exemplary environment 100 may comprise an instant message service provider 161, an email service provider 162, a music service provider 163, a video conference service provider 164, a weather service provider 165, a video service provider 166, a news service provider 167, an investment information provider 168, etc. Also, for example, the exemplary environment 100 may comprise a sports information provider, gaming provider, location information provider, map provider, database access provider, etc. The scope of various aspects of the present invention should not be limited by characteristics of any particular type of communication service provider, unless explicitly claimed.

In a non-limiting exemplary scenario, the mobile communication device 105 (or a user thereof) may be initially utilizing a first communication network (e.g., the WLAN 110) to provide a first communication service (e.g., a music providing service) to a user. The mobile communication device 105 and/or the first communication network may, for example prior to a determination to perform a hand-off, anticipate a hand-off of the mobile communication device 105 to a second communication network (e.g., the WMAN 120) and communicate various preliminary hand-off setup information with (e.g., to) the second communication network. The second communication network may then make various preparations for providing the communication service to the mobile communication device 105. The first and second communication networks may also make various preparations for providing a smooth hand-off of the mobile communication device 105 from the first communication network to the second communication network. In other words, various aspects of the present invention comprise laying the foundation for a hand-off (e.g., between two different communication networks) based on anticipation of a hand-off and a continuation of a present communication service (e.g., preparing for a hand-off before a decision is made to perform the hand-off).

Figure 2:
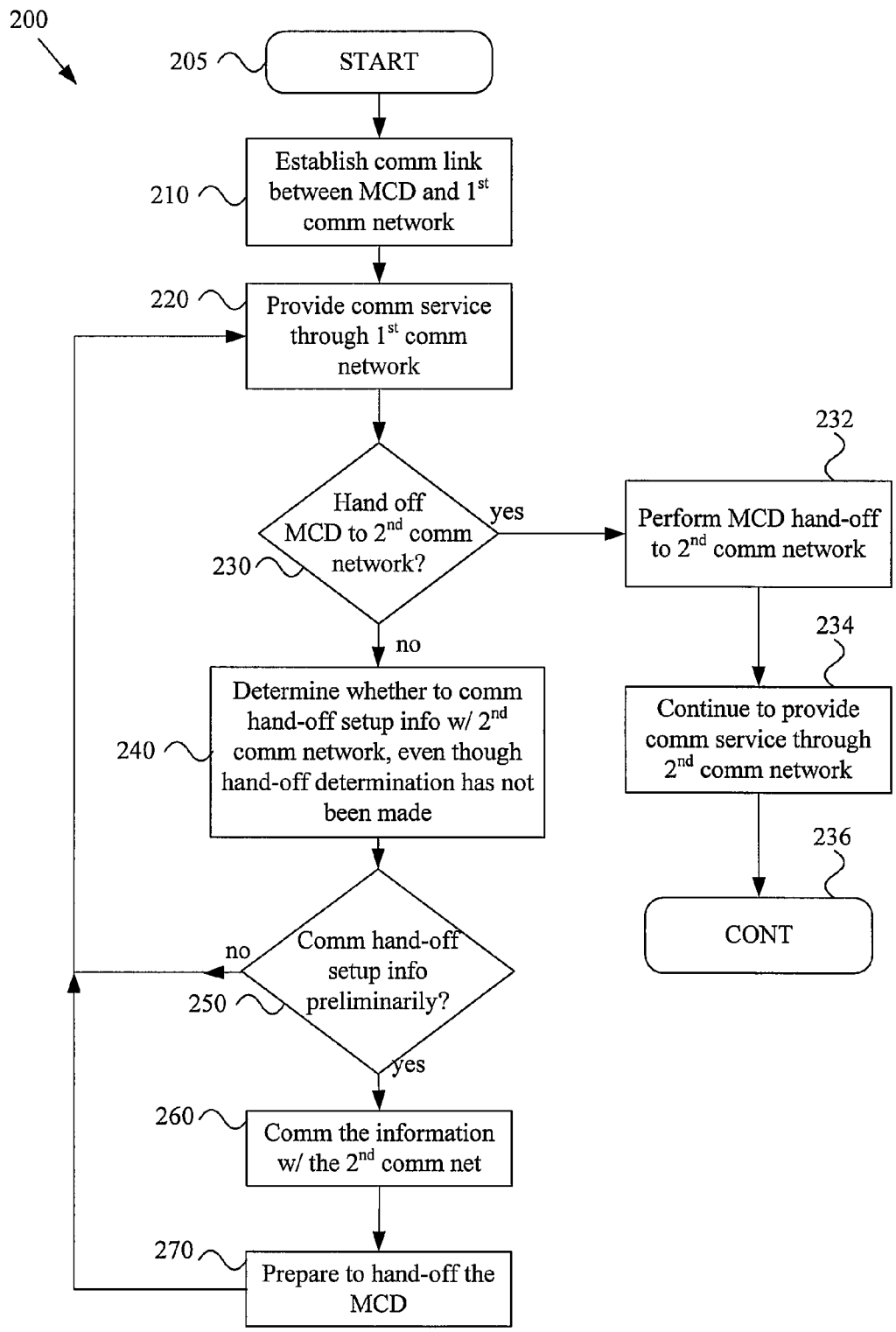
FIG. 2 is a flow diagram illustrating a non-limiting exemplary method for performing anticipatory hand-off setup in accordance with various aspects of the present invention.

FIG. 2 is a flow diagram illustrating a non-limiting exemplary method 200 for performing anticipatory hand-off setup in accordance with various aspects of the present invention. The exemplary method 200 may, for example, be implemented in any of a variety of communication network environments, a non-limiting example of which is illustrated in FIG. 1. Such a method 200 may, for example, be implemented in various system components including a mobile (or portable) communication device and/or various communication infrastructure components (e.g., access points and/or central network control components).

For example and without limitation, any or all of the functionality of the exemplary method 200 may be performed in one or more modules of a mobile communication device. Such modules may, for example, comprise hardware and/or software components. For example, any or all of the functionality discussed with regard to the method 200 may be performed by a processor (e.g., a microprocessor, microcontroller, digital signal processor, baseband processor, etc.) executing software (or firmware) instructions stored in a memory (e.g., volatile and/or non-volatile memory). Also for example, any or all of the functionality of the exemplary method 200 may be performed by an Application-Specific Integrated Circuit ("ASIC").

Similarly for example, any or all of the functionality of the exemplary method 200 may be performed by communication network infrastructure apparatus (e.g., by one or more access points, base stations, network controllers, service provider equipment, etc.). Accordingly, the scope of various aspects of the present invention should not be limited by characteristics of particular implementations unless explicitly claimed.

The following discussion will present various aspects of the present invention as being performed by particular devices (e.g., a mobile communication device, access point, network controller, etc.). Note however, that generally the various aspects of the present invention may be performed by any of a variety of devices. For example and without limitation, various aspects discussed below as being performed by a mobile communication device may be performed by network infrastructure apparatus, and vice versa. Accordingly, the scope of various aspects of the present invention should not be limited by performance of functionality by a particular device or apparatus, unless explicitly claimed.

Additionally, the exemplary method 200 will be explained in the context of a hand-off or potential hand-off of a mobile communication device from a first communication network to a second communication network. Such a scenario is provided for the sake of illustrative clarity. It should be noted that the scope of various aspects of the present invention is readily extensible to communication network hand-off scenarios involving three or more communication networks and two or more mobile communication devices.

The exemplary method 200 begins execution at step 205. The method 200 may begin executing in response to any of a variety of causes or conditions. For example and without limitation, the method 200 may begin executing in response to a user command to begin (e.g., to begin providing a particular communication service). Also for example, the method 200 may begin executing automatically (i.e., without direct user interaction). Further for example, the method 200 may begin executing in response to a system command, detected communication condition(s), power-on or reset command, predetermined operating profile, etc.). Accordingly, the scope of various aspects of the present invention should not be limited by characteristics of any particular initiating cause or condition, unless explicitly claimed.

The exemplary method 200 may, at step 210, comprise establishing a communication link between the mobile communication device and a first communication network. Various non-limiting exemplary characteristics of mobile communication devices and communication networks were presented previously in the discussion of FIG. 1.

The established communication link may, for example, correspond to the performance of a particular communication service desired by the mobile communication device or a user thereof. For example, the established communication link may comprise one or more communication channels utilized for the transfer of control, synchronization and/or general information between the mobile communication device and the first communication network.

Step 210 may comprise performing any of a variety of tasks associated with the establishment of communication links. For example and without limitation, step 210 may comprise performing any of a variety of synchronization, resource allocation, security, authentication, protocol handshaking, power control and other operations that might be necessary for the establishment of the desired communication link(s).

The exemplary method 200 may, at step 220, comprise providing a first communication service to the mobile communication device (or a user thereof) through the first communication network. For example and without limitation, the communication service may comprise characteristics of any of the exemplary services illustrated in FIG. 1 and discussed previously. Note, however, that the services illustrated in FIG. 1 are, by no means, an exhaustive list of communication services that may be provided to the mobile communication device or user thereof.

Step 220 may comprise performing any of a variety of tasks associated with establishing and/or providing a communication service. For example and without limitation, step 220 may comprise performing any of a variety of synchronization, resource allocation, security, authentication, protocol handshaking, quality-of-service establishment, power control setting, coding/decoding parameter establishment, bandwidth negotiation and other operations that might be necessary for the establishment of the desired communication service(s).

Note that the establishment of communication links (e.g., at step 210) and the providing of communication services (e.g., at step 220) may be performed in any of a variety of manners. Such manners may, for example, correspond to characteristics of particular MCDs, communication networks and/or services being utilized/provided. Accordingly, the scope of various aspects of the present invention should not be limited by characteristics of any particular manner of communication link establishment and/or providing a communication service, unless explicitly claimed.

The exemplary method 200 may, at step 230, comprise determining whether to hand off the mobile communication device from the first communication network to a second communication network. If step 230 comprises determining to hand off the mobile communication device, then execution flow of the exemplary method 200 proceeds to step 232 for performing the hand-off. If, however, step 230 comprises determining not to hand off the mobile communication device, then execution flow of the exemplary method 200 proceeds to step 240.

Step 230 may comprise determining whether to hand off the mobile communication device in any of a variety of manners. For example and without limitation, step 230 may comprise utilizing measured channel and/or signal characteristics to determine whether the communication service may be provided to the mobile communication device by the second communication network at a higher quality level than the service is presently being provided. Also for example, step 230 may comprise determining whether to hand off the mobile communication device based, at least in part, on an operating profile (e.g., as specified by network operators or a user of the mobile communication device). Additionally, for example, step 230 may comprise determining whether to hand off the mobile communication device based, at least in part, on time of day, available bandwidth, cost, network traffic management, quality-of-service requirements, location, etc. Accordingly, the scope of various aspects of the present invention should not be limited by characteristics of any particular manner of determining whether to hand off a mobile communication device from a first communication network to a second communication network, unless explicitly claimed.

As explained earlier, various aspects of the present invention will be illustrated in this written description in the context of handing off a mobile communication device from a first communication network to a second communication network. Such an illustrative scenario is presented for illustrative clarity only, and thus characteristics of the illustrative scenario should not limit the scope of various aspects of the present invention unless explicitly claimed.

For example and without limitation, exemplary scenarios may comprise handing off and/or anticipating the hand-off of a mobile communication device between a first communication network, which is primarily a cellular telephone network, and a second communication network, which is primarily a computer communication network (e.g., a Personal Area Network ("PAN"), Local Area Network ("LAN"), Metropolitan Area Network ("MAN"), Wide Area Network ("WAN"), etc.). Also, various exemplary scenarios may comprise handing off and/or anticipating the hand-off of a mobile communication device between a first communication network, which is primarily a relatively short-range computer communication network (e.g., a wireless PAN or LAN), and a second communication network, which is primarily a relatively long-range computer communication network (e.g., a wireless MAN). Additionally, various exemplary scenarios may comprise handing off and/or anticipating the hand-off of a mobile communication device between two communication networks of the same type (e.g., between a first wireless LAN and a second wireless LAN). Further, various exemplary scenarios may comprise handing off and/or anticipating the hand-off of a mobile communication device between a terrestrial communication network and a satellite communication network.

Note also that various aspects of the present invention may also apply to an intra-network handoff (i.e., between two access points of a same network). For example, a hand-off from a first access point to a second access point may be anticipated and various anticipatory actions performed before determining whether such a hand-off is actually going to occur.

In general, step 230 may comprise determining whether to hand off the mobile communication device from the first communication network to a second communication network. Accordingly, the scope of various aspects of the present invention should not be limited by characteristics of various manners of making such determination or characteristics of various inter-network or intra-network hand-off scenarios, unless explicitly claimed.

The exemplary method 200 may, at step 240, comprise determining whether hand-off setup information should be communicated with (e.g., to and/or from) the second communication network (e.g., even though a determination to hand off the mobile communication device from the first communication system to the second communication system has not been made and/or a determination of whether such a handoff is going to occur has not been made). In general, such hand-off setup information may be considered to be information that may be utilized by the second communication network to prepare for receiving the hand-off of the mobile communication device, information that may be utilized by the MCD to prepare to be handed off to the second communication network and/or information that may be utilized by the first communication network to hand off the MCD to the second communication network. Various non-limiting examples of such hand-off setup information will be presented later in the discussion of step 260.

Step 240 may also, for example, comprise determining whether to communicate hand-off setup information with more than one communication network. As a non-limiting example, step 240 may comprise determining whether to communicate hand-off setup information with the second communication network and with a third communication network. In an exemplary scenario, step 240 may comprise determining a set of any number (e.g., 1, 2, 3 or N) of most likely recipient networks to which hand-off setup information should be communicated (e.g., at step 260). For example, any of the exemplary steps illustrated in FIGS. 2 and 3 and/or discussed herein may be performed for a plurality of communication networks that are candidates for a MCD hand-off.

Step 240 may comprise determining whether to communicate hand-off setup information with the second communication network in any of a variety of manners. For example and without limitation, step 240 may comprise determining whether to communicate hand-off setup information with the second communication network based, at least in part, on historical hand-off behavior of the mobile communication device. There may, for example, be a roaming profile maintained in the mobile communication device, in one or more various networks, or at a central location (e.g., a database) accessible by a plurality of communication networks and/or the MCD. Such a roaming profile may, for example, comprise information indicative of historical hand-off behavior or patterns of hand-off behavior associated with a particular mobile communication device or user thereof. Such a roaming profile may, for example, comprise time information, day information, location information, service information, network identification information, etc.

Such a roaming profile may, for example, be maintained by the mobile communication device and/or various communication network infrastructure apparatus monitoring hand-off behavior (or patterns). For example, the mobile communication device and/or various communication network infrastructure apparatus may monitor hand-off activity of the mobile communication device. Such monitored activity may, for example, be utilized to anticipate future hand-offs. Such a roaming profile may also, for example, be manually entered by a user of the mobile communication device or a network operator.

In another example, step 240 may comprise determining whether to communicate hand-off setup information with the second communication network based, at least in part, on geographical location. Geographical location may, for example, be associated with coverage areas of one or more communication networks. Geographical location may also, for example, be associated with the mobile communication device.

Geographical location information for a mobile communication device may be ascertained in any of a variety of manners. By way of non-limiting example, geographical location for a mobile communication device may be determined utilizing a Global Positioning System ("GPS") receiver of the mobile communication device. Also for example, geographical location of a mobile communication device may also be determined using triangulation. Further for example, geographical location of a mobile communication device may be estimated based on proximity to a known network location (e.g., proximity to a wireless LAN hot spot associated with a commercial establishment having a known geographical location, a workplace LAN, campus network, airport network or any other network having a known geographical location.

Step 240 may also comprise determining whether to communicate hand-off setup information with the second communication network based, at least in part, on stationary geographical location and/or changing geographical location (or trend). For example, a changing geographical location may indicate likely movement into a coverage area associated with the second communication network. Also for example, a changing geographical location may indicate likely movement out of a coverage area associated with the first communication network. Step 240 may comprise utilizing changing geographical location to anticipate handing off the mobile communication device to the second communication network, and thus triggering the communication of various hand-off setup information with the second communication network.

In yet another example, step 240 may comprise determining whether to communicate hand-off setup information with the second communication network based, at least in part, on time. Step 240 may comprise considering any of a variety of types of time information. For example and without limitation, step 240 may comprise determining whether to communicate hand-off setup information with the second communication network based, at least in part, on any one or more of: time-of-day, absolute time, relative time, an amount of time, day, day-of-week, date, type-of-day, time window, etc.). As a non-limiting example, step 240 may comprise utilizing time-of-day information in conjunction with a roaming profile to anticipate the movement of the mobile communication device into a region of coverage serviced by the second communication network. Also for example, step 240 may comprise utilizing time information in conjunction with geographical movement information to anticipate the movement of the mobile communication device into a region of coverage serviced by the second communication network.

Step 240 may, for example, comprise determining whether to communicate hand-off setup information with the second communication network based, at least in part, on communication service identity (e.g., the identity of a particular communication service or type of communication service presently being provided to the mobile communication device by the first communication network). Such communication service identity may, for example, include the identity of a particular communication service or a particular type of communication service. For example and without limitation, step 240 may comprise determining whether to communicate hand-off setup information with the second communication network based on a determination of whether the second communication network is capable and/or willing to provide a communication service to the mobile communication device. In a non-limiting example, where the first communication network is presently providing a music service to the mobile communication device, step 240 may comprise determining whether the second communication network is able and/or willing to continue to provide the music service to the mobile communication device. In another example, where the first communication network is presently providing a Voice over Internet Protocol ("VoIP") service to the mobile communication device, step 240 may comprise determining whether the second communication network is capable and/or willing to continue to provide the VoIP service to the mobile communication device.

Step 240 may, for example, comprise determining whether hand-off setup information should be communicated with the second communication network based, at least in part, on a user-defined operating profile. Roaming profiles were generally discussed previously. Other profiles that may be considered by step 240 may comprise profiles defined by a user of the mobile communication device. For example, a user may define a profile that specifies the conditions under which anticipatory hand-off activities may be performed. Such a user-defined profile may, for example, comprise time information, service identity information, communication network identify information, etc. Such a user-defined profile may, for example, comprise information identifying preferred service providers and/or preferred communication networks to be utilized when available. In a non-limiting exemplary scenario, a user may specify in a profile that a particular wireless LAN is preferred for VoIP service when available, a particular MAN is next preferred for VoIP service, and a particular cellular telephone network is last preferred for VoIP service (e.g., through a data channel) or standard cellular telephone communication.

Similarly, step 240 may also comprise determining whether hand-off setup information should be communicated with the second communication network based, at least in part, on a communication network defined profile, operator-defined profile or service provider-defined profile. For example, a service provider may define a profile that specifies hand-off operation between various networks providing a particular service. Also for example, a network operator may define a profile that specifies various networks that are capable of (or willing to) perform hand-off activities and/or anticipatory hand-off activities.

Step 240 may, for example, comprise determining whether hand-off setup information should be communicated with the second communication network based, at least in part, on changing signal or channel characteristics. For example and without limitation, step 240 may comprise tracking changing signal or channel characteristics and/or analyzing changes in signal and/or channel characteristics to anticipate the need for a hand-off.

Step 240 may also, for example, comprise determining whether hand-off setup information should be communicated with the second communication network based, at least in part, on a type of service plan associated with a mobile communication device, or a user thereof. For example and without limitation, various anticipatory hand-off activities described herein may be associated with relatively high-end user service plans (e.g., network access plans and/or service providing plans). In such an exemplary scenario, step 240 may comprise determining whether a mobile communication device is associated with a service plan that allows the performance of anticipatory hand-off activities.

Step 240 may further, for example, comprise determining whether hand-off setup information should be communicated with the second communication network based, at least in part, on receipt of a signal indicating that such hand-off setup information should be communicated. For example and without limitation, step 240 may comprise network infrastructure apparatus performing various analysis activities (e.g., independently or in conjunction with the MCD) to determine that the hand-off setup information should be communicated. In such an exemplary scenario, network infrastructure apparatus may communicate a signal to the mobile communication device indicating that the hand-off setup information should be communicated. The mobile communication device may then, in turn, determine whether hand-off setup information should be communicated with the second communication network based, at least in part, on the received signal. For example, such a received signal may comprise characteristics of a request or a command to communicate such information.

Step 240, or portions thereof, may be performed by various communication apparatus. For example and without limitation, the mobile communication device (or one or more circuits or modules thereof) may operate to perform step 240, or portions thereof. Also for example, communication network infrastructure apparatus (e.g., access points, central controllers, etc.) may operate to perform step 240, or portions thereof. Accordingly, the scope of various aspects of the present invention should not be limited by characteristics of any particular apparatus, unless explicitly claimed.

In general, step 240 may comprise determining whether hand-off setup information should be communicated with the second communication network (e.g., even though a determination to hand-off the mobile communication device from the first communication system to the second communication system has not been made). Accordingly, the scope of various aspects of the present invention should not be limited by characteristics of the exemplary illustrations presented previously, unless explicitly claimed.

The exemplary method 200 may, at step 250, comprise controlling execution flow of the exemplary method 200. For example, step 250 may comprise controlling execution flow of the exemplary method 200 based on the determination made at step 240, discussed previously. If it is determined (e.g., at step 240) to not communicate hand-off setup information preliminarily with the second communication network, then step 250 may direct execution flow of the exemplary method 200 back up to step 220 for continued provision of the communication service with the first communication network. Alternatively, if it is determined (e.g., at step 240) to communicate hand-off setup information preliminarily with the second communication network, then step 250 may direct execution flow of the exemplary method 200 to step 260.

The exemplary method 200 may, at step 260, comprise communicating (and/or causing the communication of) preliminary hand-off setup information with (e.g., to and/or from) the second communication network (e.g., prior to a determination to perform a hand-off of the MCD from the first communication network to the second communication network or prior to a determination that such a hand-off is going to occur). Note that, depending on the system configuration, communicating hand-off setup information may comprise transmitting and/or receiving various hand-off setup information.

In various exemplary scenarios, step 260 may comprise causing the communication of hand-off setup information in any of a variety of manners. For example and without limitation, step 260 may comprise generating a signal having characteristics that cause the communication of the hand-off setup information. Such a signal may, for example, be communicated to local hardware and/or software to cause the communication of the hand-off setup information by local circuitry. Also for example, such a signal may be communicated through a communication link (e.g., wireless or wired) to another network entity which, in turn, causes the communication of the hand-off setup information.

In a first non-limiting exemplary scenario, a mobile communication device may autonomously, or in cooperation with communication infrastructure apparatus, determine to communicate hand-off setup information with the second communication network. The mobile communication device may then generate an internal signal that causes transceiver circuitry of the mobile communication device to communicate the hand-off setup information with the second communication network (e.g., directly or through the first communication network or other intermediate communication network (s)). Alternatively, or in addition to the internal signal, the mobile communication device may generate and transmit an external signal to another networked device (e.g., an access point or controller of the first and/or second communication network) that causes devices other than the mobile communication device to communicate the hand-off setup information.

Step 260 may comprise communicating any of a large variety of hand-off setup information. For example and without limitation, such hand-off setup information may comprise security information. Such security information may, for example, comprise user and/or mobile communication device authentication information. Also for example, such security information may comprise encryption/decryption information. For example, such security information may comprise password information, account information, encryption key information (e.g., public and/or private encryption key information, etc.)

Such hand-off setup information may also, for example, comprise information identifying the mobile communication device and/or a user thereof. For example, such identity information may comprise personal identification information (e.g., user name, account number, etc.) or mobile communication device identification information (e.g., serial number, issue number, model number, telephone number, IP address, other network address information, etc.).

Such hand-off setup information may additionally, for example, comprise communication channel information. Such communication channel information may, for example, comprise information describing the existing channel(s) between the mobile communication device and the first communication network and/or information of present and/or future channels between the mobile communication device and the second communication network. Such channel information may also, for example, comprise information describing one or more communication channels between the first and second communication networks also. For example, the first communication network and the second communication network may open a communication channel between the two networks for the communication of hand-off setup information.

Such hand-off setup information may also, for example, comprise any of a variety of PHY layer and/or MAC layer optimization parameters. As a non-limiting example, such information may comprise Multiple Input Multiple Output ("MIMO") setting information, training information, etc.

Such hand-off setup information may further, for example, comprise information identifying one or more communication services to be provided by the second communication network should a hand-off to the second communication network occur. For example, such service identification information may comprise information identifying a particular music service, 2-way or N-way communication service, telephony service, conferencing service, news service, location service, health-monitoring service, etc. For example, the first communication network may be presently providing one or more communication services to the mobile communication device (or a user thereof). Information describing such services may be communicated with the second communication network in preparation for a potential hand-off of the mobile communication device to the second communication network, which may then assume the responsibility of continuing to provide the one or more communication services to the mobile communication device (or a user thereof). Note that such communication service identifying information may comprise information identifying a particular company (or plurality of companies) that provides such service or the general type of service.

Such hand-off setup information may also, for example, comprise service quality information. For example, such service quality information may comprise Quality-of-Service ("QoS") information or any other type of information describing the quality of service to be provided. Such service quality information may, for example, comprise information describing various communication requirements (e.g., latency limits, bandwidth and/or data rate requirements, noise limits, error rate limits, any of a variety of channel quality metrics, etc.).

Such hand-off setup information may, for example, comprise location information (e.g., geographical location information). For example, such location information may comprise information describing the location of the mobile communication device, a network access point and/or associated coverage area, a location of a building or campus or neighborhood associated with the mobile communication device, a location associated with a particular communication network, etc. Such location information may comprise characteristics of any of a variety of types of location information (e.g., characteristics of GPS coordinate information, network sector information, any of a variety of coordinate systems describing location in 2-dimensional or 3-dimensional space, etc.). Such location information may, for example, be acquired from a positioning system (e.g., GPS), from a table correlating networks with locations, from explicit user input, from network triangulation, etc.

Such hand-off setup information may additionally, for example, comprise information identifying resources that may be necessary for continuing to provide one or more services to the mobile communication device. For example, the hand-off setup information may comprise information identifying communication bandwidth requirements, channel requirements, protocol requirements, digital signal processing requirements, coding requirements, modulation requirements, antenna requirements, power requirements, buffering requirements, etc. Such resources may, for example, be associated with providing one or more communication services to the mobile communication device and/or providing one or more communication services to the mobile communication device at a particular level of quality.

Such hand-off setup information may, for example, comprise time information. For example, such time information may comprise information identifying an anticipated time and/or time window for a hand-off. Such hand-off setup information may, for example, comprise characteristics of absolute or relative time. Such time information may, for example comprise time-of-day information, date information, day information, type-of-day information, etc.

Such hand-off setup information may, for example, comprise negotiation information between the mobile communication device, the second communication network and/or the first communication network. For example, such negotiation information may comprise information identifying requested and/or available and/or granted communication resources. Such negotiation information may, for example, comprise information identifying desired and/or minimum resources for providing one or more communication services to the mobile communication device. Such negotiation information may also, for example, comprise information identifying communication resources of the second communication network that are available for providing one or more communication services to the mobile communication device.

As mentioned briefly previously, step 260 may comprise communicating hand-off setup information between various networked devices in any of a variety of manners. For example and without limitation, the communicated hand-off setup information may originate at any of a variety of networked entities (e.g., the mobile communication device, the first communication network, the second communication network, one or more communication service providers or any networked entity). Also for example, the communicated hand-off setup information may be communicated to any of a variety of networked entities (e.g., the mobile communication device, the first communication network, the second communication network, one or more other communication networks, one or more communication service providers or any networked entity, etc.).

The previously presented hand-off setup information examples were presented as mere examples and do not represent a closed set. Accordingly, the scope of various aspects of the present invention should not be limited by characteristics of particular types of hand-off setup information unless explicitly claimed.

Step 260 may comprise communicating (e.g., transmitting and/or receiving) the information in any of a variety of manners. For example and without limitation, step 260 may comprise communicating (or causing the communication of) hand-off setup information with the second communication network by, at least in part, operating to transmit or cause the mobile communication device to transmit the hand-off setup information to the second communication network directly or through the first communication network or other intervening communication network(s). Also for example, step 260 may comprise communicating (or causing the communication of) hand-off setup information with the second communication network by, at least in part, operating to receive or cause the mobile communication device to receive hand-off setup information from the second communication network directly or through the first communication network.

Step 260 may comprise communicating, or causing the communication of, the preliminary hand-off setup information through any of a variety of communication media, using any of a variety of communication protocols, and any of a variety of communication paths (e.g., including direct communication paths and/or indirect communication paths).

The exemplary method 200 may, at step 270, comprise (e.g., prior to a determination being made to perform the hand-off or prior to a determination that such a hand off is going to occur) preparing to hand off the mobile communication device to the second communication network. Such preparations may comprise performing any of a variety of activities. For example and without limitation, step 270 may comprise utilizing the preliminary hand-off setup information to perform security functions (e.g., authentication, secure communication initialization, encryption key passing, etc.). Also for example, step 270 may comprise utilizing the preliminary hand-off setup information to allocate resources for communication between the mobile communication device and the second communication network (e.g., communication resources of the MCD, the second communication network, etc.). Such resources may, for example, be utilized during and/or after actual hand-off. Various examples of such communication resources were provided previously. Such resources may, for example, include transceiver resources, channel resources (e.g., code, frequency, timeslot, etc.), power resources, buffer resources, digital signal processing resources, encoder/decoder resources, buffer resources, memory resources, processor resources, etc.

Also, the exemplary method 200 may, at step 270, comprise establishing one or more partial and/or full communication links between the mobile communication device and the second communication network. For example and without limitation, step 270 may comprise establishing a control channel between the mobile communication device and the second communication network (e.g., for synchronization, power control, protocol hand-shaking etc.). For example, such a control channel may be utilized by the MCD and the second communication network to communicate with each other before any determination being made to perform a hand-off. Additionally for example, information associated with a service to be provided once the hand-off occurs may be queued at (e.g., pushed down to) an access point to reduce latency.

As mentioned previously, if at step 230 a determination is made to hand off the mobile communication device from the first communication network to the second communication network, execution of the exemplary method 200 may flow to step 232. The exemplary method 200 may, at step 232, comprise handing off the mobile communication device from the first communication network to the second communication network. For example, step 232 may comprise completing partial hand-off steps that may have been performed at step 270 based on the preliminary hand-off setup information communicated at step 260.

The exemplary method 200 may, at step 234, comprise continuing to provide one or more communication services by the mobile communication device with the second communication network. For example, the second communication network may continue to provide one or more communication services that were being provided to the mobile communication device by the first communication network (e.g., at step 220).

The exemplary method 236 may comprise continuing to provide communication services to the mobile communication device (e.g., either from the second communication network or another communication network).

At some point during the execution of the exemplary method 200 (e.g., after preliminary hand-off setup information was communicated at step 260 and/or preparations were made at step 270), a determination may be made that an anticipated hand-off of the mobile communication device from the first communication network to the second communication network and/or other communication networks is not going to occur. Such a determination may be made based on any of a variety of criteria. For example, and without limitation, such a determination may be made based, at least in part, on a powering down of the mobile communication device, movement of the mobile communication device out of or away from a coverage area, timeout of a timer, discontinuation of a communication service being provided to the mobile communication device, inadequate power supply, a decision to hand off the MCD to another communication network or access point, etc.

In such an exemplary scenario, it may be necessary to reverse (e.g., back out of) preparations that were made in anticipation of the hand-off. For example and without limitation, such reversing of preparations may comprise de-allocating communication resources (e.g., channel resources, signal processing resources, buffer space, memory space, etc.), tearing down communication links that were partially or fully established, etc. In a non-limiting example where preliminary hand-off setup information was communicated to a plurality of potential hand-off recipient networks, once an actual hand-off recipient network is ultimately selected, backing out hand-off preparations made with the non-selected potential hand-off recipient networks (or access points) may be performed.

Figure 3:
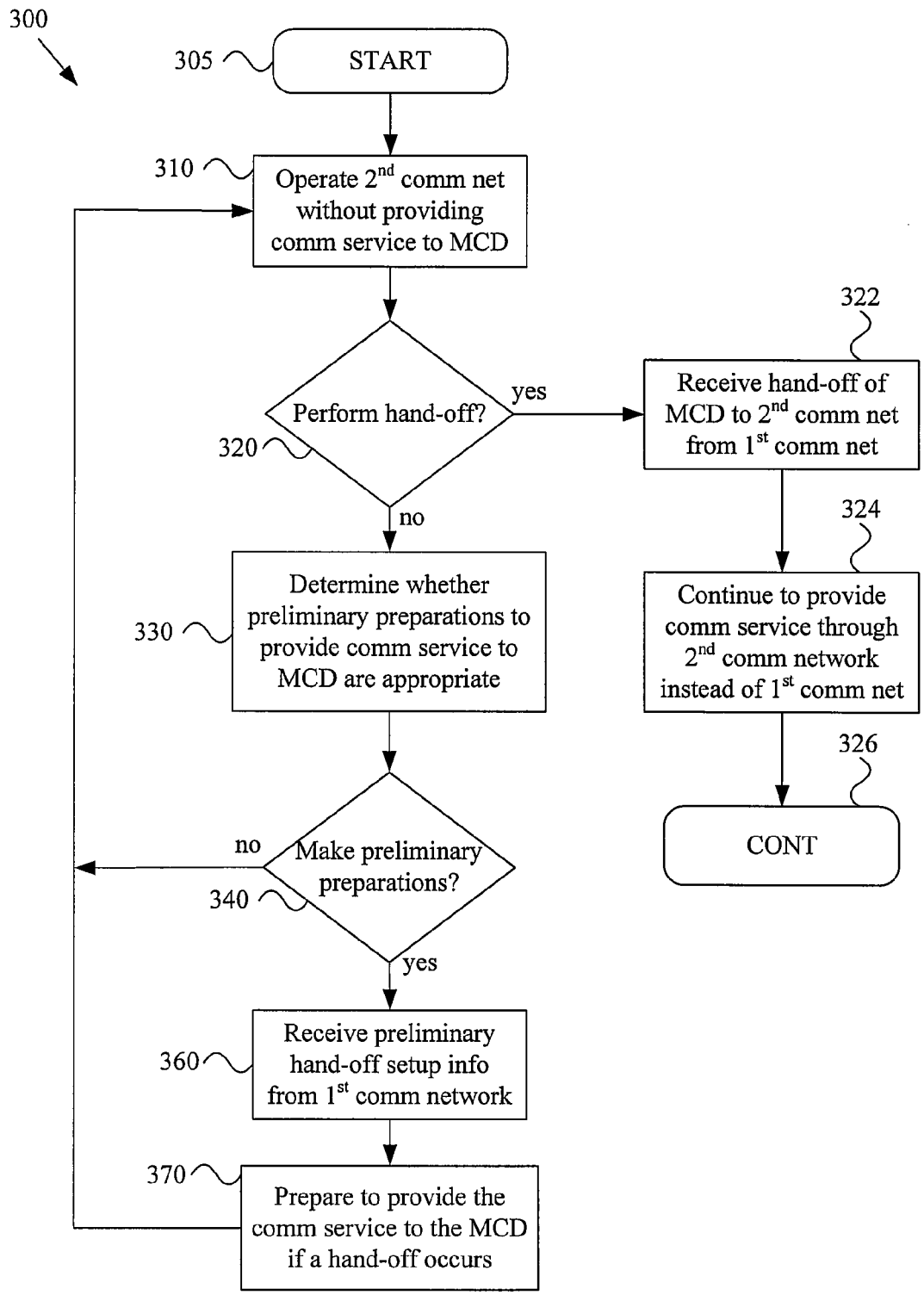
FIG. 3 is a flow diagram illustrating a non-limiting exemplary method for performing anticipatory hand-off setup in accordance with various aspects of the present invention.

FIG. 3 is a flow diagram illustrating a non-limiting exemplary method 300 for performing anticipatory hand-off setup in accordance with various aspects of the present invention. The exemplary method 300 may, for example, be implemented in any of a variety of communication network environments, a non-limiting example of which is illustrated in FIG. 1. The exemplary method 300 may, for example, be implemented in various system components including, without limitation, communication network infrastructure components (e.g., access points and/or central network control components) associated with a second communication network that may receive hand-off of an MCD from a first communication network.

For example and without limitation, any or all of the functionality of the exemplary method 300 may be performed in one or more modules of a communication network access point or controller. Such modules may, for example, comprise hardware and/or software components. For example, any or all of the functionality discussed with regard to the method 300 may be performed by a processor (e.g., a microprocessor, microcontroller, digital signal processor, baseband processor, etc.) executing software (or firmware) instructions stored in a memory (e.g., volatile and/or non-volatile memory). Also for example, any or all of the functionality of the exemplary method 300 may be performed by an Application-Specific Integrated Circuit ("ASIC").

Similarly for example, any or all of the functionality of the exemplary method 300 may be performed by mobile communication device apparatus (e.g., by one or more components of a mobile communication device) or by a combination of MCD and communication network infrastructure apparatus. Accordingly, the scope of various aspects of the present invention should not be limited by characteristics of particular implementations unless explicitly claimed.

Additionally, the exemplary method 300 will be explained in the context of a hand-off or potential hand-off of a mobile communication device from a first communication network to a second communication network. Such a scenario is provided for the sake of illustrative clarity. It should be noted that the scope of various aspects of the present invention is readily extensible to communication network hand-off scenarios involving three or more communication networks and two or more mobile communication devices.

The exemplary method 300 begins execution at step 305. The method 300 may begin executing in response to any of a variety of causes or conditions. For example and without limitation, the method 300 may begin executing in response to a user command to begin (e.g., to begin normal network communication operations). Also for example, the method 300 may begin executing automatically (i.e., without direct user interaction). Further for example, the method 300 may begin executing in response to a system command, detected communication condition(s), power-on or reset command, predetermined operating profile, etc.). Accordingly, the scope of various aspects of the present invention should not be limited by characteristics of any particular initiating cause or condition, unless explicitly claimed.

The exemplary method 300 may, at step 310, comprise operating a second communication network without providing a communication service to the mobile communication device. For example, such operation may occur while a first communication network different from the second communication network is providing one or more communication services to the mobile communication device.

The exemplary method 300 may, at step 320, comprise determining whether to perform a hand-off of the mobile communication device (e.g., determining whether to receive a hand-off of the MCD from the first communication network). Step 320 may, for example and without limitation, share any or all characteristics with step 230 of the exemplary method 200 illustrated in FIG. 2 and discussed previously. For example, step 320 may comprise making such determination based, at least in part, on signal and/or channel characteristics, an operating profile, time of day, available bandwidth, cost, network traffic management, quality-of-service requirements, location, etc. Accordingly, the scope of various aspects of the present invention should not be limited by characteristics of any particular manner of determining whether to hand off a mobile communication device from a first communication network to a second communication network, unless explicitly claimed.

Step 320 may comprise directing execution flow of the exemplary method 300 based on the determination of whether to perform (e.g., receive) a hand-off of the mobile communication device. For example, in a scenario where step 320 comprises determining to receive hand-off of the MCD from another communication network, step 320 may comprise directing execution flow of the exemplary method 300 to step 322. Alternatively, in a scenario where step 320 comprises determining not to receive hand-off of the MCD, step 320 may comprise directing execution flow of the exemplary method 300 to step 330.

The exemplary method 300 may, at step 330, comprise determining whether preliminary preparations to receive hand-off of the MCD and/or provide a communication service to the MCD are appropriate. Step 330 may, for example and without limitation, share any or all characteristics with step 240 of the exemplary method 200 illustrated in FIG. 2 and discussed previously.

For example and without limitation, step 330 may comprise determining whether to perform such preliminary hand-off preparations based, at least in part, on historical hand-off behavior of the MCD, a roaming profile, time information, day information, location information, service information, network identification information, monitored and/or manually entered hand-off activity, geographical location, service identity, service type, service providing capability, a user-defined profile, an operator or network defined profile, signal or channel characteristics, service plan, a received request and/or command, etc.

The exemplary method 300 may, at step 340, comprise controlling execution flow of the exemplary method 300. For example, step 340 may comprise directing execution flow of the exemplary method 300 based, at least in part, on the determination made at step 330. For example, if it is determined at step 330 to make preliminary hand-off and/or service providing preparations, step 340 may comprise directing execution flow to step 360. Alternatively, if it is determined at step 330 to not make preliminary hand-off and/or service providing preparations, then step 340 may comprise directing execution flow back up to step 310.

The exemplary method 300 may, at step 360, comprise communicating preliminary hand-off setup information concerning handing off the MCD to the second communication network. For example, step 360 may comprise receiving such information from the MCD and/or the first communication network. Also for example, step 360 may comprise communicating such information from the second communication network to the MCD and/or the first communication network. Various non-limiting exemplary characteristics of such information and/or the communication thereof were provided in the previous discussion (e.g., of step 260 of the exemplary method 200 illustrated in FIG. 2). For example, such information may comprise characteristics of security information, user and/or MCD identity information, channel information, service identity information, service quality information, location information, resource identification information, time information, negotiation information, power control information, etc.

Step 360 may also, as with step 260 discussed previously, comprise communicating (e.g., receiving and/or transmitting) the information in any of a variety of manners. For example and without limitation, step 360 may comprise communicating (or causing the communication of) hand-off setup information with the second communication network by, at least in part, operating to receive the hand-off setup information from the MCD and/or the first communication network, or cause the MCD or first communication network to transmit the hand-off setup information to the second communication network directly or through one or more intermediate communication networks. Also for example, step 360 may comprise communicating (or causing the communication of) hand-off setup information with the MCD and/or first communication network by, at least in part, operating to transmit the hand-off setup information to the MCD and/or the first communication network, or cause the MCD and/or the first communication network to receive the hand-off setup information from the second communication network directly or through one or more intermediate communication networks.

Step 360 may comprise communicating, or causing the communication of, the preliminary hand-off setup information through any of a variety of communication media, using any of a variety of communication protocols, and any of a variety of communication paths (e.g., including direct communication paths and/or indirect communication paths).

The exemplary method 300 may, at step 370, comprise (e.g., prior to a determination being made to perform the hand-off or prior to a determination that such a hand-off is going to occur) preparing to provide one or more communication services to the MCD if a hand-off occurs. For example, step 370 may comprise performing such preparations utilizing information communicated at step 360. Step 370 may, for example and without limitation, share any or all characteristics with step 270 of the exemplary method 200 illustrated in FIG. 2 and discussed previously. For example, step 370 may comprise performing security activities, resource allocation, forming partial and/or full communication links, etc.

As mentioned previously, if at step 330 a determination is made to hand off the mobile communication device from the first communication network to the second communication network, execution of the exemplary method 300 may flow to step 322. The exemplary method 300 may, at step 322, comprise receiving hand-off of the mobile communication device from the first communication network. For example, step 322 may comprise completing partial hand-off steps that may have been performed at step 370 based on the preliminary hand-off setup information communicated at step 360.

The exemplary method 300 may, at step 324, comprise continuing to provide one or more communication services by the mobile communication device with the second communication network (e.g., instead of with the first communication network and/or in addition to the first communication network). For example, the second communication network may continue to provide one or more communication services that were being provided to the mobile communication device by the first communication network (e.g., at step 220 of FIG. 2).

The exemplary method 326 may comprise continuing to provide communication services to the mobile communication device (e.g., either from the second communication network or another communication network).

At some point during the execution of the exemplary method 300 (e.g., after preliminary hand-off setup information was communicated at step 360 and/or preparations were made at step 370), a determination may be made that an anticipated hand-off of the mobile communication device from the first communication network to the second communication network is not going to occur. Such a determination may be made based on any of a variety of criteria. For example, and without limitation, such a determination may be made based, at least in part, on a powering down of the mobile communication device, movement of the mobile communication device out of or away from a coverage area, timeout of a timer, discontinuation of a communication service being provided to the mobile communication device, inadequate power supply, a determination being made to hand off the MCD to another communication network or access point, etc.

In such an exemplary scenario, it may be necessary to reverse (e.g., back out of) preparations that were made in anticipation of the hand-off. For example and without limitation, such reversing of preparations may comprise de-allocating communication resources (e.g., channel resources, signal processing resources, buffer space, memory space, etc.), tearing down communication links that were partially or fully established, etc.

Figure 4:
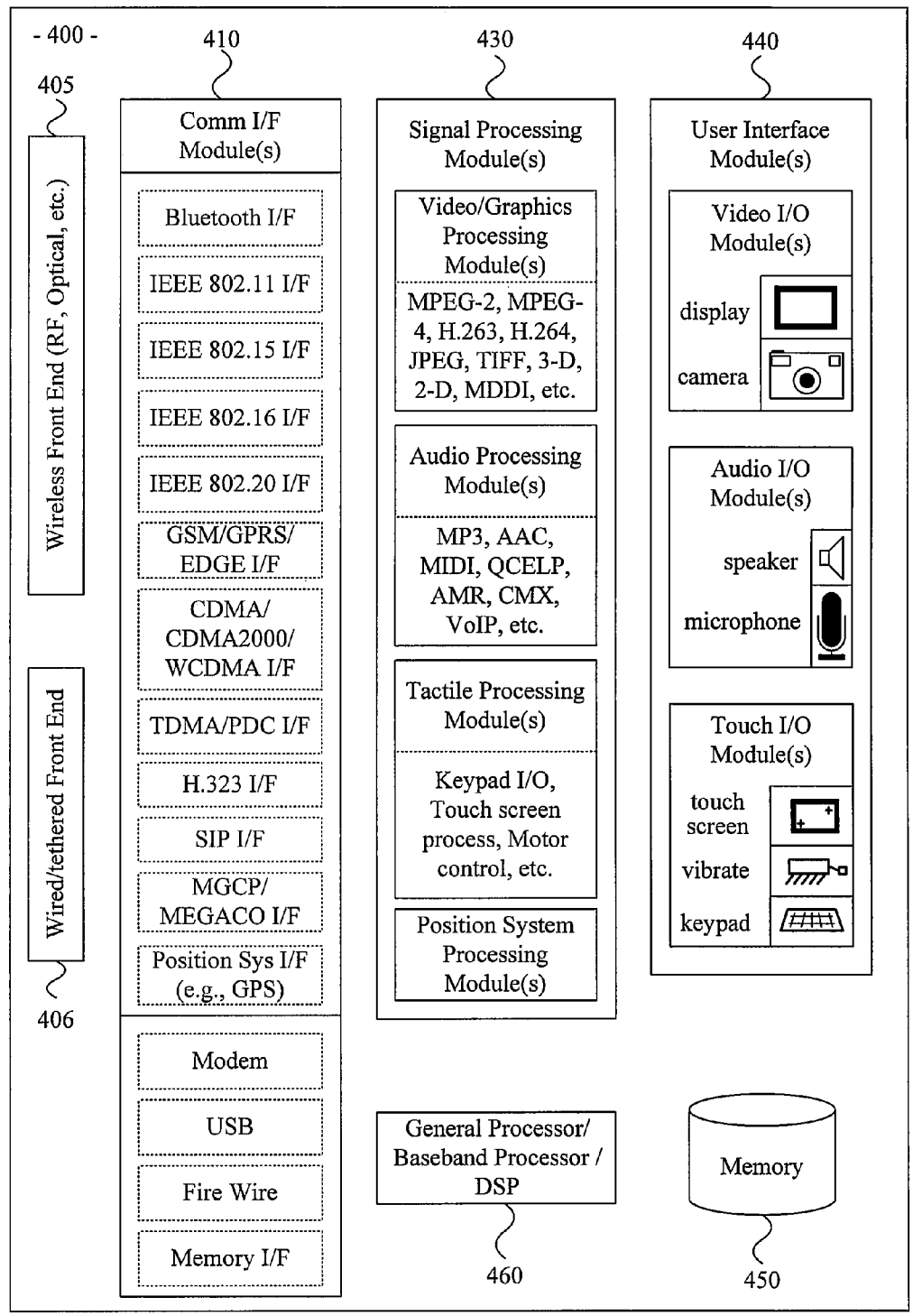
FIG. 4 is a diagram illustrating a non-limiting exemplary block diagram of a communication device that operates to implement anticipatory hand-off setup in accordance with various aspects of the present invention.

Turning next to FIG. 4, such figure is a diagram illustrating a non-limiting exemplary block diagram of a communication device 400 that operates to implement anticipatory hand-off setup in accordance with various aspects of the present invention. The communication device 400 may, for example, be a mobile communication device, a network access point or base station, a network controller or other network infrastructure component, an integrated circuit, an insertible communication module, etc. The communication device 400 may, for example, share any or all characteristics with the exemplary MCD 105 or communication network infrastructure apparatus illustrated or implied in FIG. 1.

Also, for example, the communication device 400 (or components or modules thereof) may share any or all functional characteristics with the exemplary methods 200, 300 illustrated in FIGS. 2-3. Note that the exemplary communication device 400 may perform various aspects of the present invention in hardware and/or software.

The exemplary communication device 400 may comprise a wireless 405 and/or wired 406 front end, which may operate to communicate through any of a wide variety of communication media. The exemplary communication device 400 may also comprise a variety of communication interface modules 410, which may operate to communicate with any of a wide variety of communication networks utilizing any of a wide variety of communication protocols, some of which are specified in the illustration at item 410.

The exemplary communication device 400 may also comprise a variety of signal processing modules (e.g., hardware and/or software modules) that operate to perform a variety of signal processing functions, non-limiting examples of which were provided previously in the discussion of FIGS. 2-3. Additionally, the exemplary communication device 400 may comprise a processor 460 (e.g., a baseband processor, general microprocessor, digital signal processor, etc.) that operates to execution software or firmware instructions stored in a memory 450. Such a processor 460 may thus perform any of the functionality discussed previously.

The exemplary communication device 400 may further comprise any of a variety of user interface modules 440. Such user interface modules 440 may operate to assist with providing communication services to a user and/or to receive general input and output information from a user of the communication device 400.

In summary, various aspects of the present invention provide a system and method for providing anticipatory hand-off setup between communication networks. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for a mobile communication device, the method comprising:
   in a radio communication circuit operative for radio communication with radio equipment of a first communication network and radio equipment of a second communication network, the second communication network using a radio communication network technology that is different from a radio communication network technology used by the first communication network, establishing a radio communication link between the mobile communication device and the radio equipment of the first communication network;
   determining whether to hand off communication from the first communication network to radio communication with the second communication network;
   if not handing off communication, determining whether to communicate anticipatory handoff setup information with the second communication network even though a handoff determination has not been made, including
      retrieving from storage a user profile defined by a user of the mobile communication device to specify conditions under which anticipatory handoff setup information will be communicated with the second communication network;
      determining from the retrieved user profile one or more handoff setup conditions under which anticipatory handoff setup information will be communicated with the second communication network;
      determining if a condition of the one or more handoff setup conditions is met, and
      if a condition of the one or more handoff setup conditions is met,
   determining to communicate the anticipatory handoff setup information, and
   communicating the anticipatory handoff setup information from the mobile communication device to the radio equipment of the second communication network; and
   if handing off communication, in the radio communication circuit, performing a handoff of communication from communication between the mobile communication device and the radio equipment of the first communication network to communication between the mobile communication device and the radio equipment of the second communication network.

2. The method of claim 1 wherein retrieving a user profile comprises retrieving timing data established by the user of the mobile communication device, the timing data defining times when the anticipatory handoff setup information will be communicated with the second communication network.

3. The method of claim 1 wherein retrieving a user profile comprises retrieving service identity data established by the user of the mobile communication device, the service identity data identifying communication services for which the anticipatory handoff setup information will be communicated with the second communication network.

4. The method of claim 1 wherein retrieving a user profile comprises retrieving communication network identity data established by the user of the mobile communication device, the communication network identity data identifying a communication network for which the anticipatory handoff setup information will be communicated with the second communication network.

5. The method of claim 1 wherein retrieving a user profile comprises:
   determining identity of the second communication network; and
   using the identity of the second communication network, retrieving from the user profile data defining a communication service type specified by the user of the mobile communication device for the second communication network.

6. The method of claim 1 wherein retrieving a user profile comprises:
   determining a communication service type specified by the user of the mobile communication device; and
   using the communication service type, retrieving from the user profile data defining a communication network preferred by the user for the communication service type.

7. The method of claim 6 further comprising:
   communicating the anticipatory handoff setup information from the mobile communication device to radio equipment of the communication network preferred by the user.

8. The method of claim 1 further comprising:
   determining at the mobile communication device a plurality of geographical locations of the mobile communication device over a time period;
   determining from the plurality of geographical locations likelihood of future movement of the mobile communication device relative to a coverage area of the radio equipment of the first communication network and a coverage area of the radio equipment of the second communication network; and
   based on the determined likelihood of future movement, communicating the anticipatory handoff setup information from the mobile communication device to the radio equipment of the second communication network.

9. The method of claim 8 wherein determining the likelihood of future movement of the mobile communication device comprises determining a likelihood of movement into the coverage area of the second communication network.

10. The method of claim 8 wherein determining the likelihood of future movement of the mobile communication device comprises determining a likelihood of movement out of the coverage area of the first communication network.

11. A mobile communication device comprising:
  a radio communication circuit operative for radio communication with radio equipment of a first communication network and radio equipment of a second communication network, the second communication network using a radio communication network technology that is different from a radio communication network technology used by the first communication network; the radio communication circuit operative to establish a radio communication link between the mobile communication device and the radio equipment of the first communication network;
  a memory to store a user profile, the user profile including data established by a user of the mobile communication device specifying conditions under which anticipatory handoff setup information will be communicated with the second communication network prior to handing off communication from the first communication network to the second communication network;
  a control circuit operative to determine whether to hand off communication from the first communication network to radio communication with the second communication network;
  if not handing off communication, the control circuit further operative to determine whether to communicate anticipatory handoff setup information with the second communication network even though a handoff determination has not been made, including
    determining from the user profile one or more handoff setup conditions under which anticipatory handoff setup information will be communicated with the second communication network;
    determining if a condition of the one or more handoff setup conditions is met,
  if a condition of the one or more handoff setup conditions is met, determining to communicate the anticipatory handoff setup information, and
  the radio communication circuit operative to communicate the anticipatory handoff setup information from the mobile communication device to the radio equipment of the second communication network; and
  if handing off communication, in the radio communication circuit, performing a handoff of communication from communication between the mobile communication device and the radio equipment of the first communication network to communication between the mobile communication device and the radio equipment of the second communication network.

12. The mobile communication device of claim 11 wherein the control circuit is further operative to determine from the user profile timing data established by the user of the mobile communication device to define times when the anticipatory handoff setup information will be communicated with the second communication network.

13. The mobile communication device of claim 11 wherein the control circuit is further operative to determine service identity data established by the user of the mobile communication device, the service identity data identifying communication services for which the anticipatory handoff setup information will be communicated with the second communication network.

14. The mobile communication device of claim 11 wherein the control circuit is further operative to determine communication network identity data established by the user of the mobile communication device, the communication network identity data identifying a communication network for which the anticipatory handoff setup information will be communicated with the second communication network.

15. The mobile communication device of claim 11 wherein the control circuit is further operative to determine preferred service provider identity data established by the user of the mobile communication device, the preferred service provider identity data identifying a communication service provider for which the anticipatory handoff setup information will be communicated with the second communication network.

16. The mobile communication device of claim 11 wherein the control circuit is further operative to determine from the user profile a specified communication network specified by the user of the mobile communication device for a specified communication service when the specified communication service is available from the specified communication network and wherein the radio communication circuit is operative to communicate the anticipatory handoff setup information from the mobile communication device to radio equipment of the specified communication network before handing off communication to the specified communication network.

17. The mobile communication device of claim 16 wherein the control circuit is operative in response to user specified data of the user profile to select a wireless local area network for voice over data service based on availability of the wireless local area network and wherein the radio communication circuit is operative to communicate the anticipatory handoff setup information from the mobile communication device to radio equipment of the wireless local area network prior to handing off communication to the wireless local area network.

18. The mobile communication device of claim 17 wherein the control circuit is operative in response to user specified data of the user profile to select a metropolitan area network for the voice over data service based on unavailability of the wireless local area network and availability of the metropolitan area network and wherein the radio communication circuit is operative to communicate the anticipatory handoff setup information from the mobile communication device to radio equipment of the metropolitan local area network prior to handing off communication to the metropolitan local area network.

19. The mobile communication device of claim 18 wherein the control circuit is operative in response to user specified data of the user profile to select a cellular telephone network for the voice over data service based on the unavailability of the metropolitan area network and wherein the radio communication circuit is operative to communicate the anticipatory handoff setup information from the mobile communication device to radio equipment of the cellular telephone network prior to handing off communication to the cellular telephone network.

20. The mobile communication device of claim 11 further comprising:
  a positioning circuit for determining geographical location of the mobile communication device,
  wherein the control circuit is in data communication with the positioning circuit and is further operative to determine a plurality of geographical locations of the mobile communication device over a time period, and, using the plurality of geographical locations of the mobile communication device, determine a first likelihood of future movement of the mobile communication device into a coverage area of the second communication network and determine a second likelihood of future movement of the mobile communication device out of a coverage area of the first communication network, and wherein the control circuit is further operative to use the determined first likelihood and second likelihood to determine to communicate the anticipatory handoff setup information from the mobile communication device to the radio equipment of the second communication network.

* * * * *